(12) United States Patent
Hochi

(10) Patent No.: US 7,342,064 B2
(45) Date of Patent: Mar. 11, 2008

(54) RUBBER COMPOSITION FOR TIRE AND RUN FLAT TIRE HAVING REINFORCING LAYER COMPRISING THE SAME

(75) Inventor: Kazuo Hochi, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 11/496,631

(22) Filed: Aug. 1, 2006

(65) Prior Publication Data

US 2007/0049675 A1    Mar. 1, 2007

(30) Foreign Application Priority Data

Aug. 23, 2005   (JP)   ............... 2005-241510

(51) Int. Cl.
*C08K 3/30*   (2006.01)
(52) U.S. Cl. ............ 524/418; 152/516; 152/517; 152/547
(58) Field of Classification Search ............ 524/418
See application file for complete search history.

(56) References Cited

U.S. PATENT DOCUMENTS

| | | | |
|---|---|---|---|
| 6,765,065 B2 * | 7/2004 | Oshima et al. | ............ 525/272 |
| 6,818,710 B2 * | 11/2004 | Oshima et al. | ............ 526/87 |
| 2002/0091184 A1 | 7/2002 | Ikeda | |
| 2003/0015272 A1 | 1/2003 | Teratani et al. | |
| 2003/0153692 A1 | 8/2003 | Oshima et al. | |
| 2003/0216522 A1 | 11/2003 | Oshima et al. | |

FOREIGN PATENT DOCUMENTS

JP      4-15111 A    1/1992

JP      2005-75952 A    3/2005

* cited by examiner

*Primary Examiner*—Robert D. Harlan
(74) *Attorney, Agent, or Firm*—Birch, Stewart, Kolasch & Birch, LLP

(57) ABSTRACT

A rubber composition favorably used for a reinforcing layer of a run flat tire, which have both low exothermic property and high strength.

A rubber composition for a tire, comprising 10 to 100 parts by weight of carbon black having a nitrogen adsorbing-specific area of 30 to 100 $m^2/g$ and a dibutyl phthalate oil absorption amount of at least 50 ml/100 g and at least 2 parts by weight of sulfur or a sulfur compound based on 100 parts by weight of a rubber component containing 10 to 70% by weight of a butadiene rubber obtained by copolymerizing a compound represented by the formula (1):

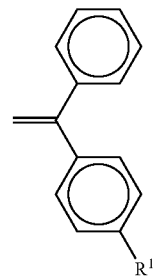

(1)

(wherein $R^1$ represents an amino group, an alkoxy group, a silyloxy group, an acetal group, a carboxyl group, a mercapto group or derivatives thereof).

12 Claims, No Drawings

RUBBER COMPOSITION FOR TIRE AND RUN FLAT TIRE HAVING REINFORCING LAYER COMPRISING THE SAME

BACKGROUND OF THE INVENTION

The present invention relates to a rubber composition for a tire and a run flat tire having a reinforcing layer comprising the same.

At present, a run flat tire having a side reinforcing layer (a reinforcing layer) with high hardness arranged at the inside of a side wall part is practically used, and a vehicle can run for a certain distance even if an air pressure is lost by puncture. Thereby, there is no necessity to always have a spare tire ready, and it can be expected that a weight of the whole vehicle is light-weighted. However, there is limitation on a speed and a distance for run flat running at puncture of a run flat tire, therefore, further improvement in durability of the run flat tire is desired.

As effective means for improving durability of the run flat tire, an example is a method of suppressing deformation by thickening a reinforcing layer and preventing fracture by the deformation. However, since the tire weight is increased, it opposes to the weight decrease which is the initial purpose of the run flat tire.

Further, there is also a method of increasing an amount of a filler for reinforcement such as carbon black and enhancing the hardness of a reinforcing rubber to suppress deformation. However, since load to a kneader in the steps of kneading, extrusion and the like is large, and heat generation in physical properties after vulcanization becomes large, the improvement in durability of the run flat tire cannot be largely expected.

Further, as effective means for improving durability of the run flat tire, an example is a method of increasing a vulcanization density by using a large amount of a vulcanizer and a vulcanization accelerator without increasing an amount of carbon black and suppressing deformation and heat generation (for example, the JP-A-2002-155169). However, elongation of a rubber is lessened, and strength at break is lowered.

SUMMARY OF THE INVENTION

An object of the present invention is to provide a rubber composition favorably used for a side reinforcing layer of a run flat tire, which have both low exothermic property and high strength, and can improve run flat durability.

The present invention relates to a rubber composition for a tire, comprising 10 to 100 parts by weight of carbon black having a nitrogen adsorbing-specific area of 30 to 100 m$^2$/g and a dibutyl phthalate oil absorption amount of at least 50 ml/100 g and at least 2 parts by weight of sulfur or a sulfur compound based on 100 parts by weight of a rubber component containing 10 to 70% by weight of a butadiene rubber obtained by copolymerizing a compound represented by the formula (1):

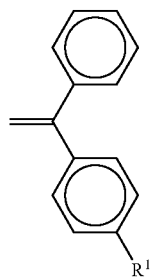

(1)

(wherein R$^1$ represents an amino group, an alkoxy group, a silyloxy group, an acetal group, a carboxyl group, a mercapto group or derivatives thereof).

Further, 5 to 120 parts by weight of a lamellar natural ore is preferably contained based on 100 parts by weight of the rubber component.

The present invention also relates to a run flat tire which has a reinforcing layer comprising the above-described rubber composition for a tire.

The strength at break of the reinforcing layer is at least 10 MPa, and the following formula:

$$E''/(E^*)^2 \leq 7.0 \times 10^{-9} \text{Pa}^{-1}$$

(wherein E″ indicates loss elastic modulus and E* indicates complex elastic modulus) is preferably satisfied.

DETAILED DESCRIPTION

The rubber composition for a tire of the present invention comprises a rubber component, carbon black, and sulfur or a sulfur compound.

The rubber component contains a butadiene rubber (hereinafter, the compound 1-copolymerizing BR) obtained by copolymerizing a compound represented by the formula (1) (hereinafter, the compound 1). Herein, the compound 1-copolymerizing BR refers to a rubber component obtained by copolymerizing the compound 1 and 1,3-butadiene rubber. As the rubber component containing the compound 1, other example is SBR obtained by copolymerizing 3 kinds of monomers which are the compound 1,1,3-butadiene and styrene, but since the SBR contains styrene, it is not preferable from the viewpoint that heat generation is large, and the compound 1-copolymerizing BR is used in the present invention.

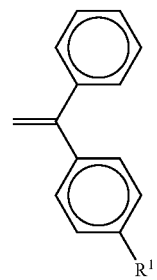

(1)

(Wherein R$^1$ represents an amino group, an alkoxy group, a silyloxy group, an acetal group, a carboxyl group, a mercapto group, or derivatives thereof.)

The above-mentioned R$^1$ is preferably an amino group from the viewpoint that interaction with a filler for reinforcement is great.

The amino group is preferably selected from the group consisting of an N,N-dimethylamino group, an N,N-diethylamino group, an N,N-dipropylamino group, an N,N-dibutylamino group, and a morpholino group, and among these, an N,N-dimethylamino group is preferable from the viewpoint that interaction with a filler for reinforcement is great.

It is preferable to copolymerize 1.1 to 5 of compounds 1 on average in one molecule of the compound 1-copolymerizing BR. When only less than 1.1 of the compounds 1 is copolymerized in one molecule of the compound 1-copolymerizing BR, run flat durability does not tend to be adequately obtained, and when more than 5 of the compounds 1 are copolymerized, polymerization tends to be difficult.

The amount ratio of the compound 1-copolymerizing BR in the rubber component is at least 10% by weight and preferably at least 20% by weight. When the amount ratio is less than 10% by weight, adequate run flat performance is not obtained. Further, the amount ratio of the compound 1-copolymerizing BR is at most 70% by weight, and preferably at most 60% by weight. When the amount ratio exceeds 70% by weight, the strength of the rubber composition becomes small, and run flat performance of a tire having a reinforcing layer comprising the rubber composition is not adequate.

The rubber component preferably further contains a polybutadiene rubber (1,2-BR) containing 1,2-syndiotactic polybutadiene crystals.

As the rubber component, diene rubbers such as a natural rubber (NR), an isoprene synthetic rubber (IR), a general polybutadiene rubber (BR) which does not contain 1,2-syndiotactic polybutadiene crystals and does not have the compound 1, a styrene-butadiene copolymer rubber (SBR), an isoprene rubber (IR), an acrylonitrile-butadiene copolymer rubber (NBR), a chloroprene rubber (CR), a butyl rubber (IIR), a styrene-isoprene-butadiene copolymer rubber (SIBR), a styrene-isoprene copolymer rubber, and an isoprene-butadiene copolymer rubber can be used in combination, in addition to the compound 1-copolymerizing BR and 1,2-BR. These diene rubbers may be used alone, or at least 2 kinds thereof may be used in combination. Among these, a natural rubber (NR) is preferable from the viewpoint of processability and strength, by using the compound 1-copolymerizing BR and the 1,2-BR in combination.

A nitrogen adsorbing-specific surface area ($N_2SA$) of carbon black is at least 30 $m^2/g$, and preferably at least 35 $m^2/g$. When the $N_2SA$ is less than 30 $m^2/g$, reinforcing property is inadequate, and adequate durability is not obtained. Further, the nitrogen adsorbing-specific surface area ($N_2SA$) of carbon black is at most 100 $m^2/g$, preferably at most 80 $m^2/g$, and more preferably at most 60 $m^2/g$. When the $N_2SA$ exceeds 100 $m^2/g$, the rubber composition easily generates heat.

A dibutyl phthalate oil absorption amount (DBP oil absorption amount) of carbon black is at least 50 ml/100 g, and preferably at least 80 ml/100 g. When the DBP oil absorption amount is less than 50 ml/100 g, it is difficult to obtain adequate reinforcing property.

An amount of carbon black is at least 10 parts by weight based on 100 parts by weight of the rubber component, preferably at least 20 parts by weight, and more preferably at least 30 parts by weight. When the amount of carbon black is less than 10 parts by weight, the strength of the rubber composition is not adequately obtained. Further, the amount of carbon black is at most 100 parts by weight, preferably at most 70 parts by weight, and more preferably at most 60 parts by weight. When the amount of the carbon black exceeds 100 parts by weight, processability is lowered in a step of kneading a rubber and a step of extrusion.

As sulfur or a sulfur compound used in the present invention, insoluble sulfur is preferable from the viewpoint of suppressing the surface precipitation of sulfur.

As the insoluble sulfur, sulfur having an average molecular weight is at least 10,000, and at least 100,000 in particular, and at most 500,000, and at most 300,000 in particular is preferably used. When the average molecular weight is less than 10,000, decomposition at a low temperature easily occurs, and surface precipitation tends to be easily caused, and when the average molecular weight exceeds 500,000, dispersibility in the rubber tends to be lowered.

An amount of the sulfur or sulfur compound is at least 2 parts by weight, and preferably at least 3 parts by weight based on 100 parts by weight of the rubber component. When the sulfur or sulfur compound is less than 2 parts by weight, adequate hardness is not obtained. Further, the amount of the sulfur or sulfur compound is at most 10 parts by weight, and preferably at most 8 parts by weight based on 100 parts by weight of the rubber component. When it exceeds 10 parts by weight, storage stability of an unvulcanized rubber tends to be damaged.

The rubber composition for a tire of the present invention preferably further contains a lamellar natural ore, and more preferably contains micas. As the micas, examples are kaolinite, sericite, phlogopite and muscovite are preferable, and among these, sericite is preferable in particular from the viewpoint of the balance between hardness and strength at break. These may be used alone, or at least 2 kinds thereof may be used in combination.

An aspect ratio (ratio of the maximum diameter to thickness) of the lamellar natural ore is at least 3, preferably at least 5, and more preferably at least 10. When the aspect ratio of the lamellar natural ore is less than 3, adequate rubber hardness does not tend to be obtained. Further, the aspect ratio of the lamellar natural ore is preferably at most 30, and more preferably at most 20. When the aspect ratio exceeds 30, dispersion in the rubber is lowered, and the strength at break tends to be lowered. Further, the aspect ratio is obtained by observing the lamellar natural ore by an electron microscope, measuring long diameters and short diameters of arbitrary 50 particles, and determining a ratio a/b from the average long diameter a to the average short diameter b.

An average particle diameter of the lamellar natural ore is preferably at least 2 μm, more preferably at least 5 μm, and further preferably at least 10 μm. When the average particle diameter is less than 2 μm, cost is necessary for pulverization, and adequate rubber hardness does not tend to be obtained. Further, the average particle diameter of the lamellar natural ore is preferably at most 30 μm, and more preferably at most 20 μm. When the average particle diameter exceeds 30 μm, the lamellar natural ore becomes the cause of fracture, and bending resistance fatigue performance tends to be lowered. Further, the average particle diameter indicates the average value of the long diameters of the lamellar natural ore.

An amount of the lamellar natural ore is preferably at least 5 parts by weight based on 100 parts by weight of the rubber component, more preferably at least 10 parts by weight, and preferably at least 15 parts by weight in particular. When the amount is less than 5 parts by weight, balance between hardness obtained by compounding the lamellar natural ore and low exothermic heat tends to be insufficient. Further, the amount of the lamellar natural ore is preferably at most 120 parts by weight, more preferably at most 80 parts by weigh, and further preferably at most 60 parts by weight. When the amount exceeds 120 parts by weight, besides dispersion into the rubber becomes difficult, heat generation tends to be easily caused.

It is preferable that a silane coupling agent is added in the rubber composition of the present invention in combination with the lamellar natural ore.

Examples of the silane coupling agent are bis(3-triethoxysilylpropyl)tetrasulfide, bis(3-trimethoxysilylpropyl)tetrasulfide, bis(2-triethoxysilylpropyl)tetrasulfide, 3-mercaptopropyltriethoxysilane, 2-mercaptoethyltrimethoxysilane, and these can be used alone, or an arbitrary combination there of can be used.

The amount of the silane coupling agent is preferably at least 2 parts by weight based on 100 parts by weight of the lamellar natural ore, and further preferably at least 4 parts by weight. When it is less than 2 parts by weight, an effect by compounding the silane coupling agent does not tends to be not adequately obtained. Further, the amount is preferably at most 20 parts by weight based on 100 parts by weight of the lamellar natural ore, and more preferably at most 15 parts by weight. When it exceeds 20 parts by weight, the effect to be obtained does not tend to be adequately obtained while cost is high.

Further, the rubber composition for a tire of the present invention may contain zinc oxide, a wax, stearic acid, an oil, an antioxidant, a vulcanization accelerator and the like, which are used for general rubber compounding, within a range of not damaging the effect of the present invention.

The rubber composition for a tire of the present invention is preferably used for a reinforcing layer of a run flat tire. Herein, the reinforcing layer refers to a lining strip layer which is arranged inside of the side wall part of the run flat tire. It can support a vehicle in a state in which an air pressure is lost by existence of the reinforcing layer in the run flat tire, and can impart excellent run flat durability.

When the rubber composition for a tire of the present invention is used for the reinforcing layer of the run flat tire, the strength at break ($T_B$) of the reinforcing layer is preferably at least 10 MPa, and more preferably at least 12 MPa. When $T_B$ is less than 10 MPa, the rubber composition is broken during run flat running by bending due to the load of a vehicle, and run flat performance tends to be remarkably insufficient. Further, $T_B$ is measured for the reinforcing layer after vulcanization, and measured according to JIS K6251.

Further, the loss elastic modulus (E") and the complex elastic modulus (E*) of the rubber composition for side reinforcement of the present invention preferably satisfy the following formula:

$$E''/(E^*)^2 \leq 7.0 \times 10^{-9} Pa^{-1}$$

$E''/(E^*)^2$ is preferably $7.0 \times 10^{-9}$ $Pa^{-1}$, and more preferably $6.0 \times 10^{-9}$ $Pa^{-1}$. When $E''/(E^*)^2$ is larger than $7.0 \times 10^{-9}$ $Pa^{-1}$, heat generation by deformation at run flat is increased, and thermal degradation of a rubber tends to be accelerated to reach breaking. Further, the loss elastic modulus E" and complex elastic modulus E* were measured under the conditions of a measurement temperature of 70° C., an initial strain of 10%, a dynamic strain of ±1%, and a frequency of 10 Hz.

EXAMPLES

The present invention is explained in detail based on Examples, but is not limited only thereto.

Various chemicals used in Examples and Comparative Examples are described in detail in the following.

NR: RSS#3

BR1: VCR412 (amount ratio of 1,2-syndiotactic polybutadiene crystals in BR1 of 12% by weight) available from Ube Industries, Ltd.

BR2: Compound 1-copolymerizing BR available from Sumitomo Chemical Co., Ltd. (In the formula, $R^1$=N,N-dimethylamino group, 1.2 of compounds 1 on average is copolymerized with 1,3-butadiene in one molecule of BR2.)

Carbon black (FEF): DIABLACK E ($N_2SA$ of 41 $m^2/g$, DBP oil absorption amount of 115 ml/100 g) available from Mitsubishi Chemical Corporation Sericite: KM-8 (aspect ratio of 15, average particle diameter of 17 μm) available from Nippon Forum Co.

Stearic acid: "TSUBAKI" available from NOF Corporation

Zinc oxide: ZINC OXIDE NO.2 available from Mitsui Mining & Smelting Co., Ltd.

Antioxidant: ANTIGENE 6C available from Sumitomo Chemical Co., Ltd.

Silane coupling agent: Si-75 available from Degussa-Huls Corporation

Insoluble sulfur: MU-CRON OT available from Shikoku Chemicals Corporation

Vulcanization accelerator: NOCCELER NS (N-tert-butyl-2-benzothiazolylsulfenamide) available from OUCHI SHINKO CHEMICAL INDUSTRIAL CO., LTD.

EXAMPLES 1 AND 2 AND COMPARATIVE EXAMPLES 1 AND 2

Components other than insoluble sulfur and a vulcanization accelerator were kneaded according to the compounding content shown in Table 1 at 150° C. for 4 minutes. The insoluble sulfur and the vulcanization accelerator were added to the obtained kneaded articles, and the mixture was kneaded at 80° C. for 3 minutes to obtain unvulcanized rubber compositions.

Then, run flat tires with a size of 215/45ZR17 in which lining strip layers which were obtained by vulcanizing the respective unvulcanized rubber compositions in Examples and Comparative Examples were arranged as a reinforcing layer of the inside of a side wall were prepared, and respective evaluations below were carried out.

<TB (strength at break)>

Sheets with a thickness of 2 mm were cut out from the lining strip layers of run flat tires, and $T_B$ (MPa) was measured according to JIS K6251.

<E"/(E*)²>

E" (loss elastic modulus) and E* (complex elastic modulus) were measured at a measurement temperature of 70° C. with an initial strain of 10%, a dynamic strain of ±1% and a frequency of 10 Hz using a viscoelastic spectrometer manufactured by Iwamoto Seisakusyo K. K. to calculate $E''/(E^*)^2$.

<Run Flat Performance>

A vehicle ran on a drum at a speed of 80 km/h by run flat tires with an air inner pressure of 0 kPa, and running distances until the tires were broken were measured. Then, by referring to the running distance in Comparative Example 1 as the basis (100), other running distances were expressed by indices. It is indicated that the larger the value is, the more excellent the run flat durability is.

The evaluation results are shown in Table 1.

TABLE 1

|  | Ex. | | Com. Ex. | |
| --- | --- | --- | --- | --- |
|  | 1 | 2 | 1 | 2 |
| Composition (parts by weight) | | | | |
| NR | 60 | 40 | 75 | 20 |
| BR 1 | 20 | 20 | 20 | — |
| BR 2 | 20 | 40 | 5 | 80 |
| FEF | 50 | 50 | 50 | 50 |
| Sericite | 30 | 30 | 30 | 30 |

TABLE 1-continued

|  | Ex. | | Com. Ex. | |
| --- | --- | --- | --- | --- |
|  | 1 | 2 | 1 | 2 |
| Stearic acid | 2 | 2 | 2 | 2 |
| Zinc oxide | 3 | 3 | 3 | 3 |
| Antioxidant | 1 | 1 | 1 | 1 |
| Silane coupling agent | 3 | 3 | 3 | 3 |
| Insoluble sulfur | 5 | 5 | 5 | 5 |
| Vulcanization accelerator | 2 | 2 | 2 | 2 |
| Evaluation results |  |  |  |  |
| TB[MPa] | 13.7 | 12.2 | 14.2 | 9.7 |
| E"/(E*)² [10⁻⁹ Pa⁻¹] | 6.1 | 5.8 | 6.9 | 8.2 |
| Run flat performance | 136 | 149 | 100 | 81 |

According to the present invention, the rubber composition for a tire having both low exothermic property and high strength can be provided by respectively compounding the specific amounts of a specific butadiene rubber, specific carbon black, and sulfur or a sulfur compound. Further, the run flat durability can be also improved by using the rubber composition as the reinforcing layer of a run flat tire.

What is claimed is:

1. A run flat tire which has a reinforcing layer which comprises a rubber composition, comprising:

10 to 100 parts by weight of carbon black having a nitrogen adsorbing-specific area of 30 to 100 m²/g and a dibutyl phthalate oil absorption amount of at least 50 ml/100 g, and at least 2 parts by weight of sulfur or a sulfur compound based on 100 parts by weight of a rubber component containing 10 to 70% by weight of a butadiene rubber obtained by copolymerizing a compound represented by the formula (1):

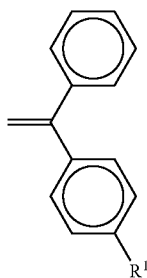

(1)

wherein $R^1$ represents an amino group, an alkoxy group, a silyloxy group, an acetal group, a carboxyl group, a mercapto group, or derivatives thereof.

2. The run flat tire of claim 1, wherein the rubber composition further comprises 5 to 120 parts by weight of a lamellar natural ore based on 100 parts by weight of said rubber component.

3. The run flat tire of claim 1, wherein the strength at break of the reinforcing layer is at least 10 MPa, which satisfies the following formula:

$$E''/(E^*)^2 \leq 7.0 \times 10^{-9} \text{ Pa}^{-1}$$

wherein E" indicates loss elastic modulus and E* indicates complex elastic modulus.

4. The run flat tire of claim 1, wherein the carbon black is present in an amount of 20 to 70 parts by weight, the sulfur or sulfur compound is present in an amount of 3 to 10 parts by weight, and the rubber component contains 20 to 60% by weight of the butadiene rubber obtained by copolymerizing a compound represented by the formula (1).

5. The run flat tire of claim 1, wherein the carbon black is present in an amount of 30 to 60 parts by weight and the sulfur or sulfur compound is present in an amount of 3 to 8 parts by weight.

6. The run flat tire of claim 1, wherein $R^1$ represents an amino group, an alkoxy group, a silyloxy group, an acetal group, a carboxyl group or a mercapto group.

7. The run flat tire of claim 1, wherein $R^1$ represents an amino group.

8. The run flat fire of claim 1, wherein the tire structure includes a side wall, and wherein the reinforcing layer is a lining stripe layer which is arranged inside of the side wall portion of the run flat tire.

9. The run flat fire of claim 2, wherein the lamellar natural ore is present in an amount of 10 to 80 parts by weight.

10. The run flat fire of claim 2, wherein the lamellar natural ore is present in an amount of 15 to 60 parts by weight.

11. The run flat tire of claim 2, wherein the aspect ratio of the lamellar natural ore is 3 to 30, and the average particle diameter of the lamellar natural ore is 2 to 30 μm.

12. The run flat tire of claim 2, wherein the aspect ratio of the lamellar natural ore is 10 to 20, and the average particle diameter of the lamellar natural ore is 10 to 20 μm.

* * * * *